United States Patent
Yanagisawa (10) Patent No.: US 11,928,798 B2
(45) Date of Patent: Mar. 12, 2024

(54) IMAGE PROCESSING APPARATUS TO MERGE IMAGES, IMAGE PROCESSING METHOD, IMAGING APPARATUS, AND STORAGE MEDIUM

(71) Applicant: CANON KABUSHIKI KAISHA, Tokyo (JP)

(72) Inventor: Keisuke Yanagisawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 819 days.

(21) Appl. No.: 17/008,111

(22) Filed: Aug. 31, 2020

(65) Prior Publication Data
US 2021/0073960 A1  Mar. 11, 2021

(30) Foreign Application Priority Data
Sep. 11, 2019  (JP) ................. 2019-165454

(51) Int. Cl.
*G06T 5/50* (2006.01)
*G06T 5/00* (2006.01)
*G06T 7/73* (2017.01)
*H04N 23/73* (2023.01)

(52) U.S. Cl.
CPC ............... *G06T 5/50* (2013.01); *G06T 5/007* (2013.01); *G06T 7/73* (2017.01); *H04N 23/73* (2023.01); *G06T 2207/20221* (2013.01)

(58) Field of Classification Search
CPC .. G06T 5/50; G06T 5/007; G06T 7/73; G06T 2207/20221; G06T 2207/10144; G06T 2207/20208; G06T 7/33; G06T 5/008; H04N 23/73; H04N 23/741
See application file for complete search history.

(56) References Cited

FOREIGN PATENT DOCUMENTS

| JP | 07-135599 | A |   | 5/1995 |         |
|----|-----------|---|---|--------|---------|
| JP | H07135599 | A | * | 5/1995 |         |
| JP | H07135599 | A | * | 5/1995 |         |
| JP | 2012-235390 | A |   | 11/2012 |         |
| JP | 2016076805 | A | * | 5/2016 | ............... G06T 5/50 |
| JP | 2017-038165 | A |   | 2/2017 |         |
| JP | 2017038165 | A | * | 2/2017 |         |

OTHER PUBLICATIONS

Chris Harris et al.; "A Combined Corner and Edge Detector;" Plessey Research Roke Manor, 1988; pp. 147.151.
Jianbo Shi et al.; "Good Features to Track;" IEEE Conference on Computer Vision and Pattern Recognition; CVPR, Seattle, Jun. 1994 ; pp. 1-8.

* cited by examiner

*Primary Examiner* — Mekonen T Bekele
(74) *Attorney, Agent, or Firm* — Canon U.S.A., Inc. IP Division

(57) ABSTRACT

An image processing apparatus includes a correction unit, a first detection unit, a second detection unit, and a merging unit. The correction unit is configured to perform correction of a misalignment between a plurality of images captured at exposures different from each other. The first detection unit is configured to detect an inappropriate area from the plurality of images. The second detection unit is configured to detect a feature point for the correction by preferentially using an area other than the inappropriate area of the plurality of images. The merging unit is configured to merge the plurality of images on which the correction has been performed.

21 Claims, 12 Drawing Sheets

FIG.1

FIG.3A
LOW EXPOSURE IMAGE AFTER DEVELOPMENT

FIG.3B
HIGH EXPOSURE IMAGE AFTER DEVELOPMENT

FIG.3C
HIGH LUMINANCE OBJECT OF LOW EXPOSURE IMAGE

MISMATCH BETWEEN HIGH LUMINANCE OBJECTS

FIG.3D
HIGH LUMINANCE OBJECT OF HIGH EXPOSURE IMAGE

FIG.4A LOW EXPOSURE IMAGE

FIG.4B HIGH EXPOSURE IMAGE

FIG.5

FIG.6B
POSITION-BASED EDGE IMAGE

FIG.6A
MAP IMAGE

FIG.6C
EDGE IMAGE

MASK PROCESSING

FIG.6D
EDGE IMAGE AFTER MASK PROCESSING

EDGE IMAGE

FIG.10B

IMAGE AFTER FEATURE POINT DETECTION

TEMPLATE AREA

IMAGE PROCESSING APPARATUS TO MERGE IMAGES, IMAGE PROCESSING METHOD, IMAGING APPARATUS, AND STORAGE MEDIUM

BACKGROUND

Technical Field

The disclosure relates to an image processing apparatus, and particularly relates to an image processing apparatus that creates an image having an increased dynamic range, i.e., a high-dynamic-range (HDR) image, by merging images captured at the same angle of view while sequentially changing exposure.

Description of the Related Art

An HDR merging technology that generates an image having an increased dynamic range by merging a plurality of images captured at exposures different from each other has been know. In the HDR merging, images are aligned. Examples of the alignment methods include, a technique, as discussed in Japanese Patent Application Laid-Open No. H07-135599, in which feature points corresponding between images are detected and the images are aligned using the detected feature points.

In the HDR merging, however, since images captured at exposures different from each other are used, positions of detected feature points may not match each other due to an influence of the exposures. In particular, in an image captured at a high exposure, detection accuracy of a feature point decreases in an area which is close to saturation, and consequently, alignment accuracy of images also decreases.

SUMMARY

One disclosed aspect of the embodiments is directed to an image processing apparatus that performs high-dynamic-range (HDR) merging and can reduce or prevent a decrease in accuracy of alignment between images due to exposure.

According to an aspect of the disclosure, an image processing apparatus includes a correction unit, a first detection unit, a second detection unit, and a merging unit. The correction unit is configured to perform correction of a misalignment between a plurality of images captured at exposures different from each other. The first detection unit is configured to detect an inappropriate area from the plurality of images. The second detection unit is configured to detect a feature point for the correction by preferentially using an area other than the inappropriate area of the plurality of images. The merging unit is configured to merge the plurality of images on which the correction has been performed.

Further features of the disclosure will become apparent from the following description of exemplary embodiments with reference to the attached drawings.

DESCRIPTION OF THE EMBODIMENTS

Exemplary embodiments of the disclosure will be described below in detail with reference to the attached drawings.

Figure 1:
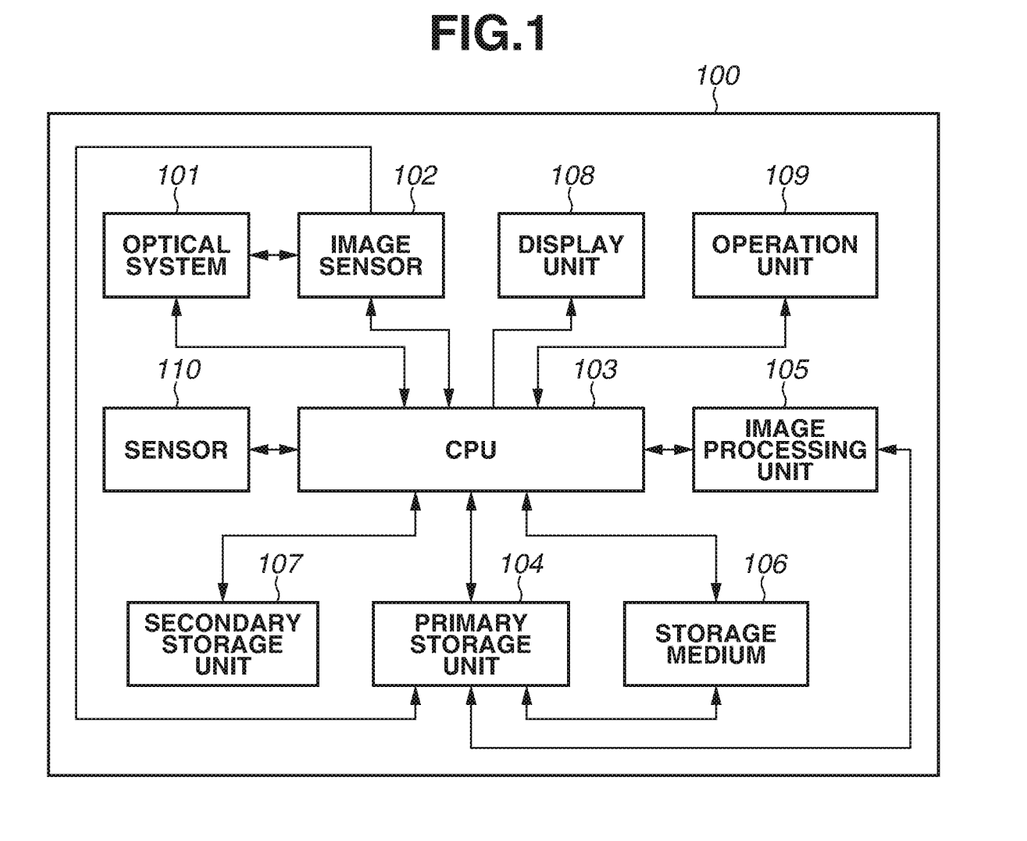
FIG. 1 is a block diagram illustrating a basic configuration of a digital camera according to an exemplary embodiment.

FIG. 1 is a block diagram illustrating a basic configuration of a digital camera according to a first exemplary embodiment.

A digital camera 100 may be any electronic apparatus with a camera function, such as a mobile phone having a camera function or a computer with a camera. An optical system 101 includes a lens, a shutter, and an iris diaphragm, and is controlled by a central processing unit (CPU) 103 to focus light from an object on an image sensor 102. The image sensor 102, such as a charge-coupled device (CCD) image sensor or a complementary metal oxide semiconductor (CMOS) image sensor, converts the light focused by the optical system 101 into an image signal.

The CPU 103 implements a function of the digital camera 100 by controlling each unit included in the digital camera 100, based on an input signal and a program stored beforehand. A primary storage unit 104 is, for example, a volatile storage device such as a random access memory (RAM), stores data temporarily, and is used for work of the CPU 103. Information stored in the primary storage unit 104 is used by an image processing unit 105 and can also be stored into a storage medium 106. A secondary storage unit 107 is, for example, a nonvolatile storage device such as an electrically erasable programmable read-only memory (EEPROM), stores a program (firmware) for controlling the digital camera 100 and various kinds of setting information, and is used by the CPU 103. The CPU 103 is in communication with at least one of the primary storage unit 104 and the secondary storage unit 107 and is configured to execute the instructions stored in the corresponding memory to perform operations described in the following.

The storage medium 106 stores data of, for example, an image captured and stored in the primary storage unit 104. The storage medium 106 can be detached from the digital camera 100 like, for example, a semiconductor memory card, and the stored data can be read out by a personal computer to which the storage medium 106 is attached. In other words, the digital camera 100 has an attachment/detachment mechanism and a reading/writing function for the storage medium 106. A display unit 108 displays images such as a viewfinder image in imaging, a captured image, and a graphical user interface (GUI) image for an interactive operation. An operation unit 109 is an input device group that receives an operation by a user and transmits input information corresponding to the operation to the CPU 103. Examples of the operation unit 109 may include a button, a lever, a touch panel, and an input device using a sound or a view. A sensor 110 acquires information representing movement of the digital camera 100. Examples of the sensor 110 include input devices such as a gyroscope and an acceleration sensor. A movement amount and an angular velocity of the digital camera 100 can be acquired by operations performed by the CPU 103.

In the digital camera 100 according to the present exemplary embodiment, the image processing unit 105 has a plurality of patterns of image processing to be applied to a captured image, and the patterns can each be set as an imaging mode via the operation unit 109. The image processing unit 105 performs, for example, image processing such as development processing, and color-tone adjustment corresponding to the imaging mode. At least some of the functions of the image processing unit 105 may also be performed by the CPU 103.

Next, a processing procedure of high-dynamic-range (HDR) merging in the present exemplary embodiment will be described with reference to some of the drawings.

Figure 2:
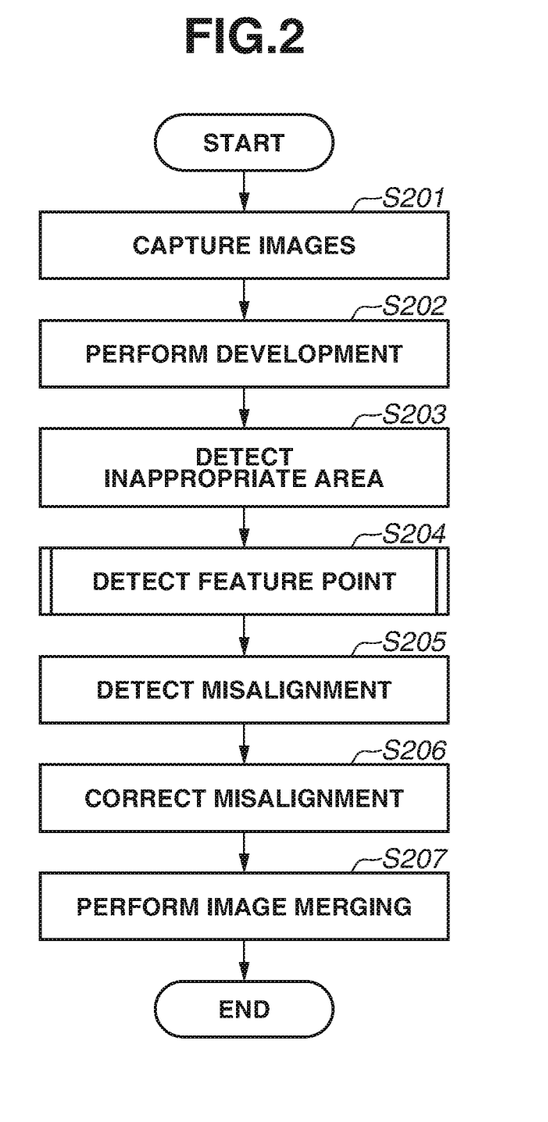
FIG. 2 is a flowchart illustrating high-dynamic-range (HDR) merging according to a first exemplary embodiment.

FIG. 2 is a flowchart illustrating the HDR merging in the present exemplary embodiment.

In step S201, the image sensor 102 captures a plurality of images at the same angle of view under different exposure conditions, based on an instruction of the CPU 103. Here, the instruction of the CPU 103 includes an exposure difference which has been set beforehand.

In step S202, the image processing unit 105 develops the plurality of images captured by the image sensor 102 in step S201.

In step S203, the image processing unit 105 detects an inappropriate area from each of the images developed in step S202.

The inappropriate area described here is an area determined to have a possibility that detection of a feature point is to be inaccurate due to saturation in a high exposure image or high luminance close to saturation. Next, the inappropriate area will be described below in detail with reference to some of the drawings.

Figure 3A:
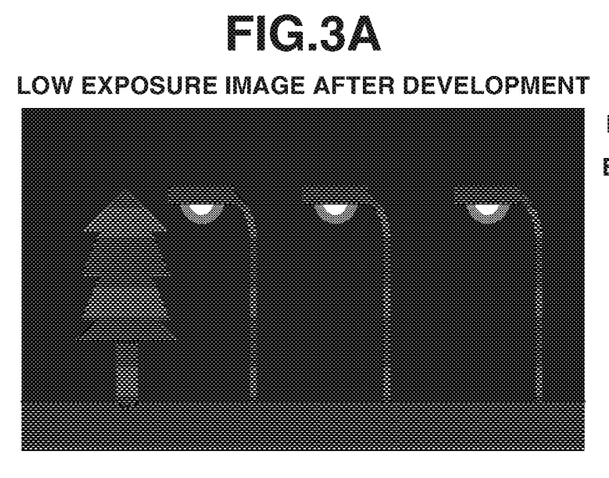
FIGS. 3A to 3D are diagrams illustrating an inappropriate area according to the exemplary embodiment.
Figure 3B:
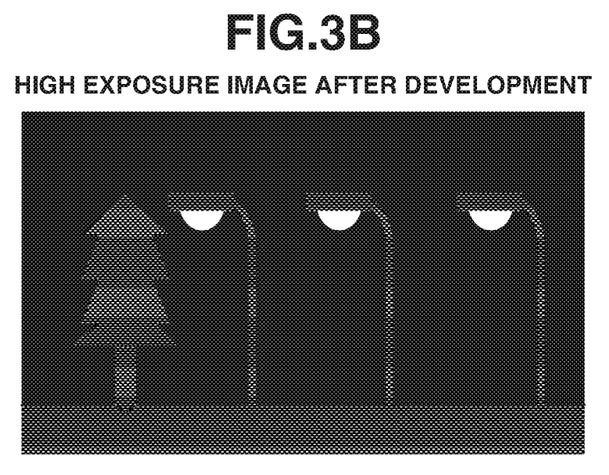
Figure 3C:
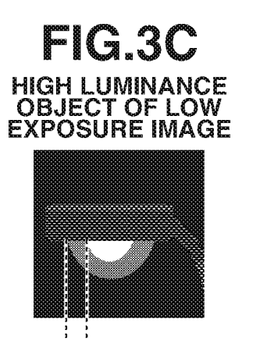
Figure 3D:
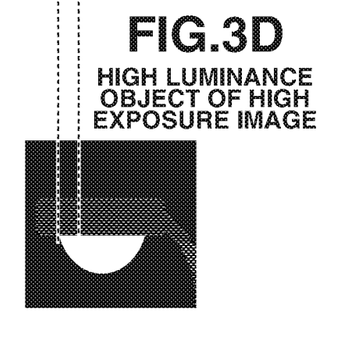

FIGS. 3A to 3D are diagrams illustrating the inappropriate area in the present exemplary embodiment. FIG. 3A and FIG. 3B illustrate a low exposure image after development and a high exposure image after development, respectively, which are obtained by imaging the same object. FIG. 3C and FIG. 3D illustrate an enlarged high luminance object in FIG. 3A and an enlarged high luminance object in FIG. 3B, respectively. In a comparison of FIG. 3C to FIG. 3D, a mismatch can be seen between the ranges of the respective high luminance objects. The mismatch between the high luminance objects leads to inaccurate correction of a misalignment between the images because a feature point to be detected is not at the correct position.

In a saturation area, the above-described phenomenon in which the feature point is not accurately detected occurs. Even in a high luminance pixel not reaching saturation, a gradation property declines with convergence of a gamma curve to a saturation value, and therefore the low exposure image and the high exposure image have gradation properties different from each other. Consequently, similar to in a saturation area, correction accuracy of a misalignment is decreased.

Figure 4A:
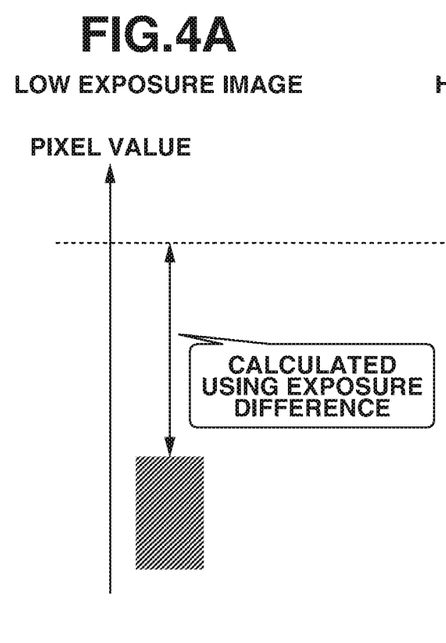
FIGS. 4A and 4B are diagrams illustrating detection of the inappropriate area according to the exemplary embodiment.
Figure 4B:
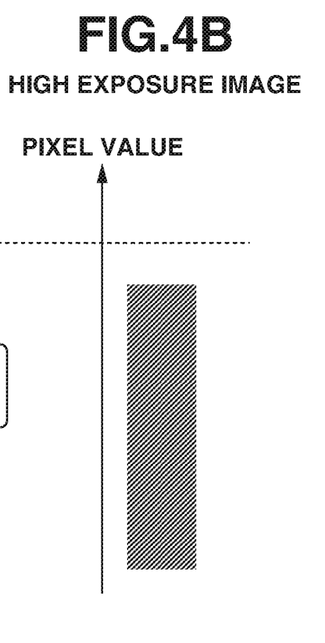

FIGS. 4A and 4B are diagrams illustrating detection of the inappropriate area in the present exemplary embodiment. FIG. 4A and FIG. 4B illustrate pixel values of a pixel in the low exposure image and the high exposure image, respectively, at the same position. The exposure difference between the low exposure image and the high exposure image is the exposure difference set in step S201. Using the exposure difference, the pixel value in the high exposure image at the same position as in the low exposure image in a case where saturation is not factored in can be calculated from the pixel value in the low exposure image. A dotted line in FIGS. 4A and 4B indicates the calculated pixel value in the high exposure image in the case where the saturation is not factored in. Next, the measured value of the pixel value in the high exposure image is compared with the calculated value. In the target area of the high exposure image, the calculated value and the measured value of the pixel value are supposed to be equal in a case where the saturation is not reached. In a case where the calculated value is higher than the measured value, the CPU 103 determines that the saturation is reached in the high exposure image.

The pixel value that becomes saturated in the high exposure image can be identified using the above-described method. In order that a high luminance area not reaching a saturation value can also be determined as the inappropriate area, a value smaller than the saturation value can be set as a threshold, and the inappropriate area can be detected by comparing the pixel value in the high exposure image and the threshold. Such a threshold may be set beforehand.

Therefore, in step S203, the image processing unit 105 detects the inappropriate area by comparing the pixel value of the pixel in the high exposure image and the set threshold. Alternatively, the image processing unit 105 detects the inappropriate area, by calculating the pixel value of the pixel in the high exposure image from the pixel value of the pixel in the low exposure image and the exposure difference, and comparing the calculated pixel value and the threshold.

In the above-described processing, a luminance value may be used in place of the pixel value.

In step S204, the image processing unit 105 detects a feature point from each of the images developed in step S202. In the feature point detection in step S204, the image processing unit 105 detects the feature point from an area except for the inappropriate area detected in step S203.

Figure 5:
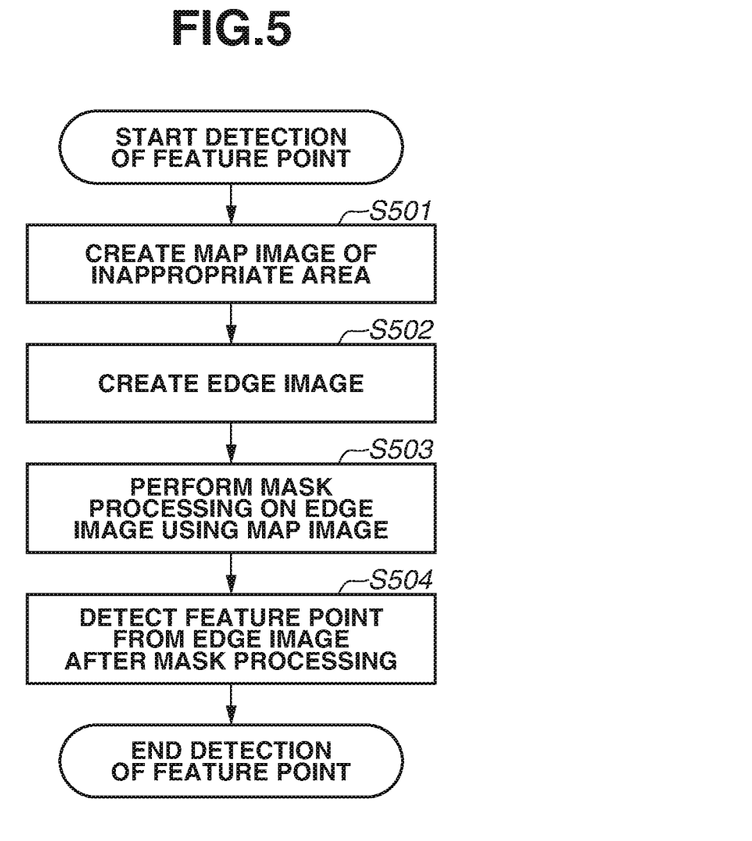
FIG. 5 is a flowchart illustrating detection of a feature point according to the first exemplary embodiment.

FIG. 5 is a flowchart illustrating the detection of a feature point in the present exemplary embodiment. FIGS. 6A to 6D are diagrams illustrating the detection of a feature point in the present exemplary embodiment. The detection of a feature point will be described with reference to FIG. 5 and FIGS. 6A to 6D.

Figure 6A:
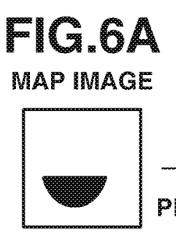
FIGS. 6A to 6D are diagrams illustrating the detection of a feature point according to the first exemplary embodiment.

In step S501, the image processing unit 105 creates a map image of the inappropriate area detected in step S203. FIG. 6A illustrates an example of the map image of the inappropriate area.

Figure 6B:
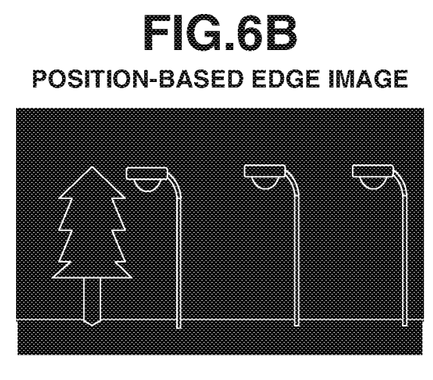
Figure 6C:
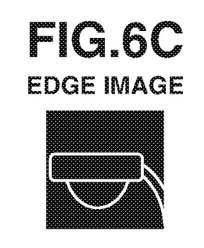

In step S502, the image processing unit 105 detects an edge from the image developed in step S202, and creates an edge image based on the detected edge. FIG. 6B illustrates an example of the edge image. A filter, such as a differential filter or a Prewitt filter, can be used as a method of generating the edge image. The processing order of step S501 and step S502 may be reversed.

Figure 6D:
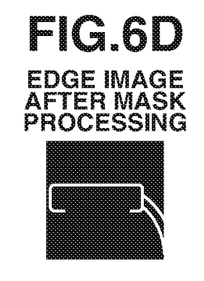

In step S503, the image processing unit 105 performs mask processing on the edge image, using the map image. For example, in FIGS. 6A to 6D, the edge image illustrated in FIG. 6D is obtained after the mask processing is performed by the image processing unit 105 on the edge image illustrated in FIG. 6C.

In step S504, the image processing unit 105 detects a feature point from the edge image after the mask processing in step S503. In this processing, the image processing unit 105 divides the image subjected to the processing in step S503 into blocks each including one or more pixels horizontally and vertically, and detects a feature point from each of the blocks. Examples of a method for detecting a feature point include the Harris corner detector, and the Shi and Tomasi.

The Harris corner detector is discussed in a known document: "Chris Harris & Mike Stephens, A COMBINED CORNER AND EDGE DETECTOR, Plessey Research Roke Manor, 1988".

The Shi and Tomasi method is discussed in a known document: "Jianbo Shi & Carlo Tomasi, Good Features to Track, CVPR, 1994".

Using the above-described method, the image processing unit 105 calculates a feature amount of each of the pixels in the block and detects a pixel having a large feature amount as a feature point in the block. As a result, the image processing unit 105 can detect coordinates suitable for detection of a misalignment amount of the images.

The description is given of the detection of a feature point.

In step S205, the image processing unit 105 detects a misalignment between the images. The detection of the misalignment is performed for each of the blocks obtained by the division in step S504.

Figure 7A:
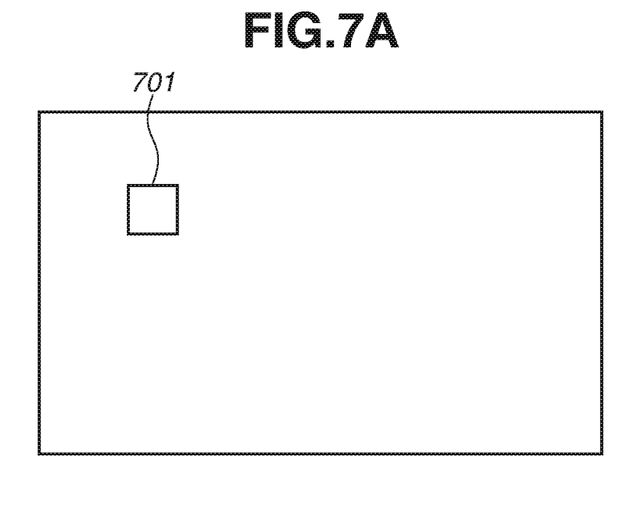
FIGS. 7A and 7B are diagrams illustrating detection of a misalignment between images according the exemplary embodiment.
Figure 7B:
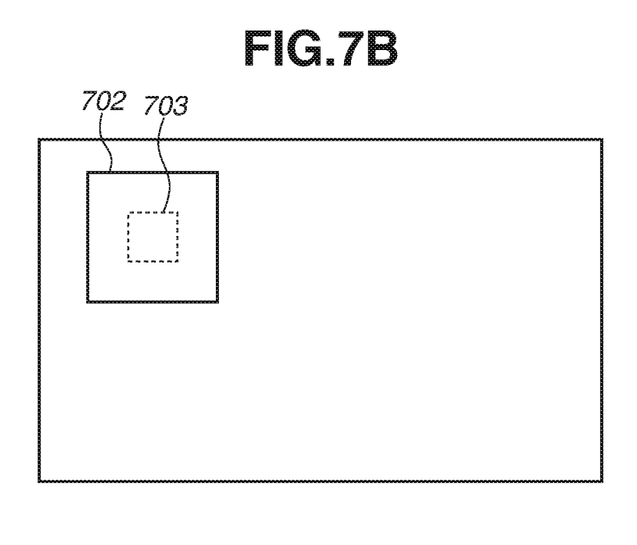

FIGS. 7A and 7B are diagrams illustrating the detection of the misalignment between the images in the present exemplary embodiment. The image processing unit 105 detects a misalignment from an image illustrated in FIG. 7B and an image illustrated in FIG. 7A. In FIG. 7A, a feature point is detected by the processing in step S504. A template area 701 is an area centered on the feature point detected in step S504. A search area 702 in the image illustrated in FIG. 7B includes an area at the same position as the position of the template area 701 and is uniformly extended in vertical and horizontal directions around the area. A correlation value calculation area 703 having the same size as the template area 701 is in the search area 702. The CPU 103 calculates a correlation value with respect to the template area 701, while moving the correlation value calculation area 703 throughout the search area 702. Examples of a method of calculating the correlation value include the sum of absolute differences (SAD). The smaller the SAD is, the higher the similarity of texture between the template area 701 and the correlation value calculation area 703 is. A motion vector can be calculated using the positional relationship between the correlation value calculation area where the SAD is minimum and the template area. The correlation value may be calculated using the sum of squired differences (here, SSD) or normalized cross correlation (here, NCC), other than the SAD.

The CPU 103 performs the above-described calculation of the motion vector for all the feature points detected in step S504. Next, the CPU 103 calculates a transformation coefficient for correcting the misalignment. The CPU 103 calculates, for example, an affine coefficient to be used for affine transformation in which linear transformation and translation are combined. When coordinates (x,y) before misalignment correction are determined from one motion vector, coordinates (x',y') after the misalignment correction are obtained. The following equation (1) is satisfied, where the affine coefficient is A.

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad (1)$$

The coordinates before and after correction that correspond to the motion vector obtained from each of all the feature points are substituted into the equation (1), a plurality of matrix equations is formed, and the minimum affine coefficient A is calculated using the method of least squares.

In step S206, the image processing unit 105 corrects the misalignment using the affine coefficient A.

In the above-described processing, the image processing unit 105 detects the edge for the image illustrated in FIG. 7A, performs the mask processing, and detects a feature point. Meanwhile, using the above-described method, the edge detection and the mask processing may not be performed for the image illustrated in FIG. 7B. This is also the case where there are three or more misalignment-correction target images. Once the image processing unit 105 detects a feature point for one of the misalignment-correction target images, the misalignment can be corrected using the above-described method.

Figure 8:
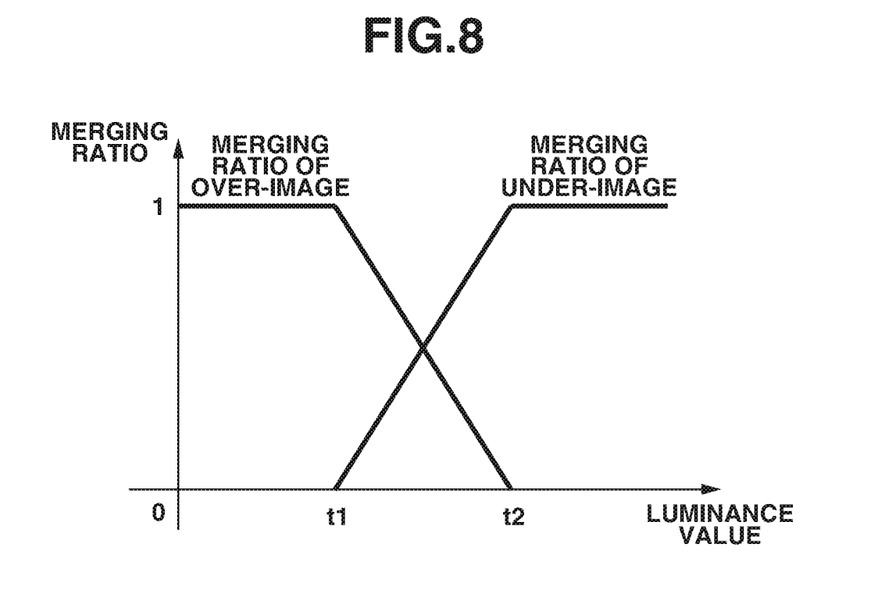
FIG. 8 is a diagram illustrating an example of generation of an HDR image according the exemplary embodiment.

In step S207, the image processing unit 105 generates an HDR image by performing the HDR merging on the images in which the misalignment correction is performed in step S206. FIG. 8 is a diagram illustrating an example of the generation of the HDR image in the present exemplary embodiment. The image processing unit 105 performs the HDR merging on two images that are an under-image and an over-image. In a graph in FIG. 8, the vertical axis represents the merging ratio of the under-image or the over-image, and the horizontal axis represents the luminance value of a reference image. While the reference image here may be either the under-image or the over-image, thresholds, which are thresholds t1 and t2 in the horizontal axis, varies depending on which one of the under-image or the over-image is used as the reference image. In FIG. 8, the over-image is used as the merged image in an area where the luminance value of the reference image is lower than the threshold t1, and the under-image is used as the merged image in a case where the luminance value of the reference image is higher than the threshold t2. In an area where the luminance value is between the threshold t1 and the threshold t2, the image processing unit 105 merges the under-image and the over-image using the merging ratio corresponding to the luminance value.

In the first exemplary embodiment, the inappropriate area where the luminance value is high is detected and a feature point is not detected in the inappropriate area. Thus, accuracy of the misalignment correction for HDR merging can be increased.

In a second exemplary embodiment, unlike the first exemplary embodiment, a feature point in the inappropriate area is also used for the misalignment correction in some cases. The second exemplary embodiment will be described below, mainly a difference from the first exemplary embodiment.

In the first exemplary embodiment, a feature point in the inappropriate area is not used for the misalignment correction. However, not using a feature point in the inappropriate area reduces the number of motion vectors to be used for the misalignment correction, and consequently accuracy of the misalignment correction is decreased. In particular, for example, in a case where misalignment is corrected using an affine coefficient, using at least three motion vectors not parallel with each other is desirable in order to calculate an affine coefficient. Completely excluding feature points of the inappropriate area prevent calculation of an affine coefficient, and consequently the misalignment correction cannot be performed.

The processing procedure of HDR merging in the second exemplary embodiment is similar to that in the exemplary embodiment except for step S204. In other words, the second exemplary embodiment is different in terms of the processing of detecting a feature point in step S204.

Figure 9:
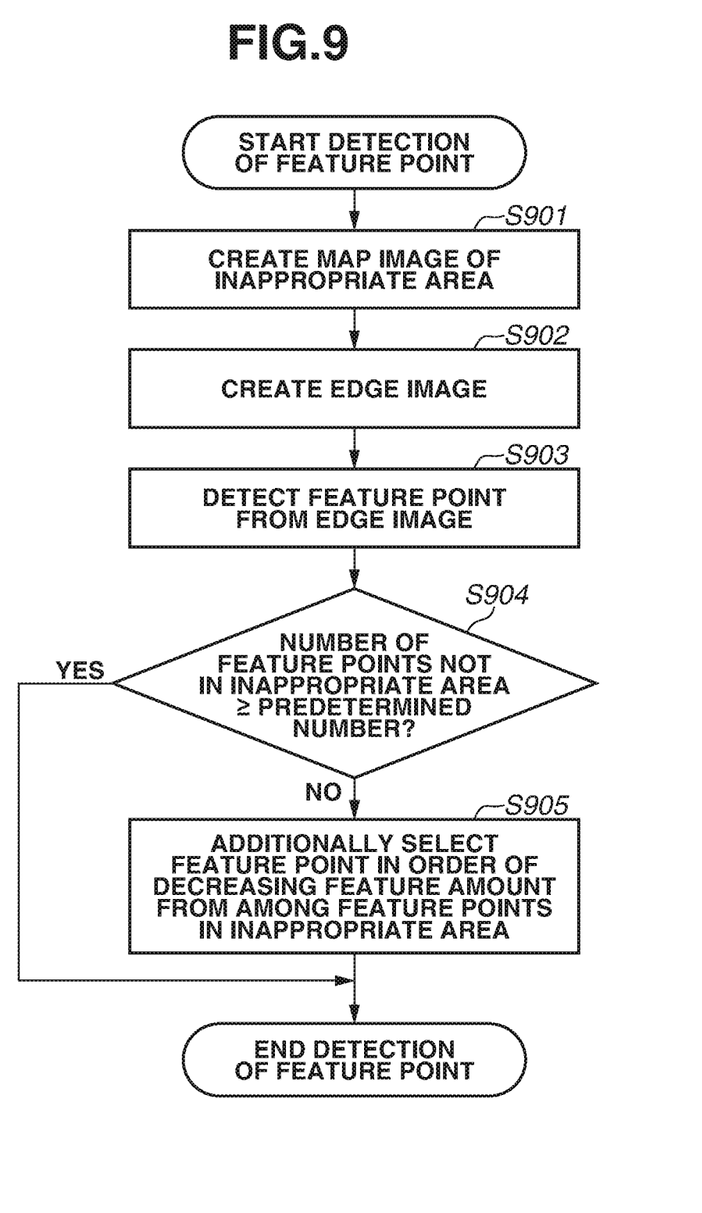
FIG. 9 is a flowchart illustrating detection of a feature point according to a second exemplary embodiment.

FIG. 9 is a flowchart illustrating detection of a feature point in the present exemplary embodiment.

In step S901, the image processing unit 105 creates a map image of the inappropriate area, as with step S501.

In step S902, the image processing unit 105 creates an edge image, as with step S502.

In step S903, the image processing unit 105 detects a feature point from the edge image created in step S902. In this processing, the image processing unit 105 detects the feature point from the entire edge image, without factoring the inappropriate area in.

Figure 10A:
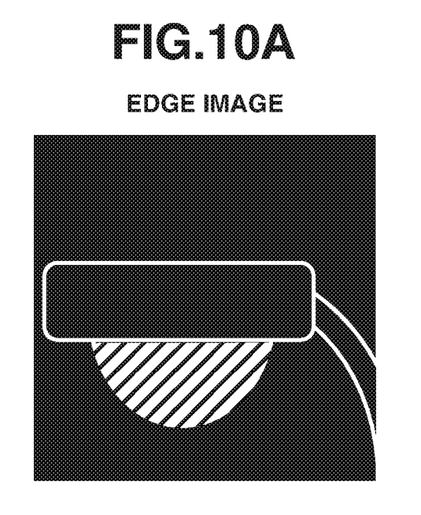
FIGS. 10A and 10B are diagrams illustrating detection of a feature point according the exemplary embodiment.
Figure 10B:
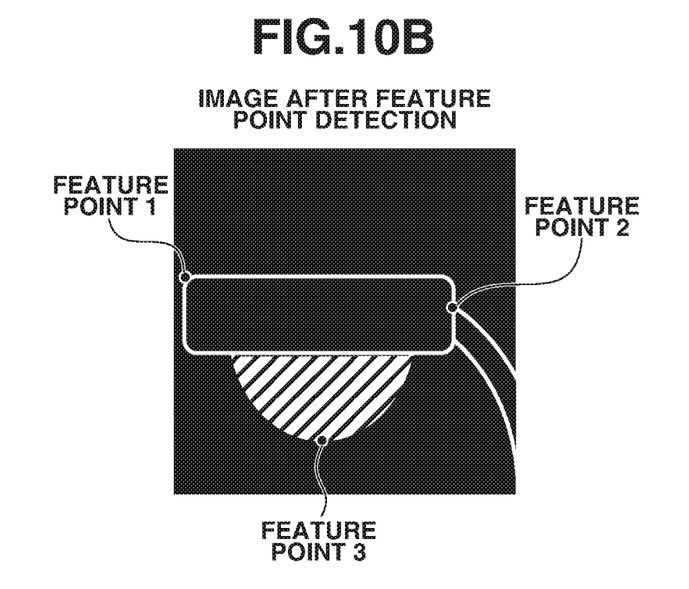

FIGS. 10A and 10B are diagrams illustrating the detection of a feature point in the present exemplary embodiment. FIG. 10A illustrates the edge image created in step S902. A diagonally shaded portion in FIG. 10A indicates the inappropriate area. FIG. 10B illustrates feature points detected by the image processing unit 105.

In step S904, the CPU 103 determines whether the number of feature points not in the inappropriate area is equal to or more than a predetermined number. For example, in FIG. 10B, a feature point 1 and a feature point 2 are not in the inappropriate area, and a feature point 3 is in the inappropriate area. Here, in a case where the predetermined number is, for example, three, the image illustrated in FIG. 10B is an image in which the number of feature points not in the inappropriate area is not equal to or more than the predetermined number. In a case where the number of feature points not in the inappropriate area is equal to or more than the predetermined number (YES in step S904), the flow ends, and the feature points in the inappropriate area detected here are used for the misalignment correction. In a case where the number of feature points not in the inappropriate area is not equal to or more than the predetermined number (NO in step S904), the processing proceeds to step S905. In step S905, the image processing unit 105 additionally selects a feature point(s). The method of additionally selecting a feature point(s) is to select a feature point(s) in decreasing order of feature amount until the number of feature points becomes equal to the predetermined number. For example, in a case where the predetermined number is three and the number of feature points not in the inappropriate area is two, a feature point having the highest feature amount is additionally selected from among feature points in the inappropriate area.

In this processing, in a case where misalignment correction is performed using the affine transformation, at least three feature points are used in order to calculate an affine coefficient, and therefore the above-described predetermined number is set to be at least three.

Figure 11:
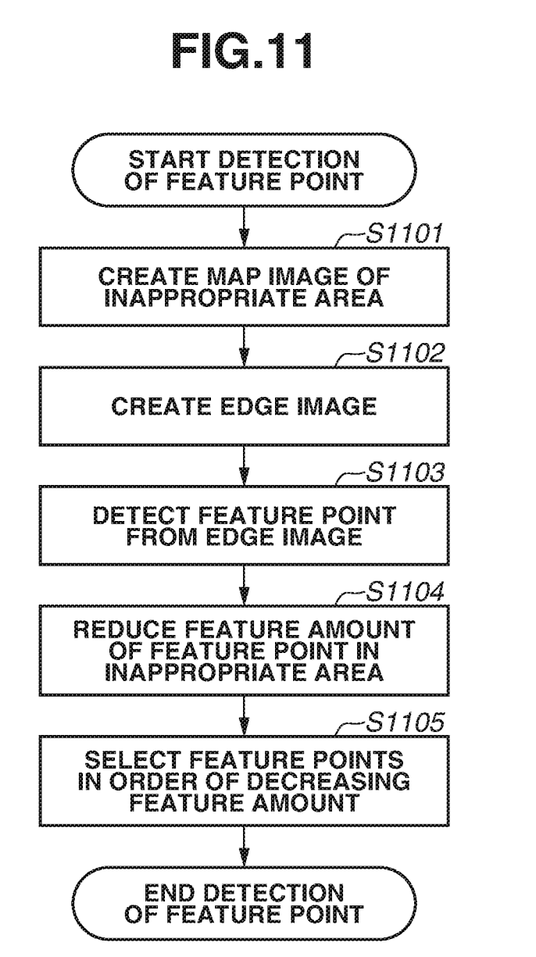
FIG. 11 is a flowchart illustrating another example of the detection of a feature point according to the second exemplary embodiment.

Alternatively, the present exemplary embodiment may be implemented by the following method. FIG. 11 is a flowchart illustrating another example of the detection of a feature point according to the present exemplary embodiment.

Step S1101 to step S1103 are similar to step S901 to step S903.

In step S1104, the CPU 103 assigns a weight smaller than 1 to the feature amount of a feature point in the inappropriate area, to reduce the feature amount.

In step S1105, the image processing unit 105 selects a predetermined number of feature points in decreasing order of feature amount after weighting, and determines the selected feature points to be used for the misalignment correction.

Figure 12:
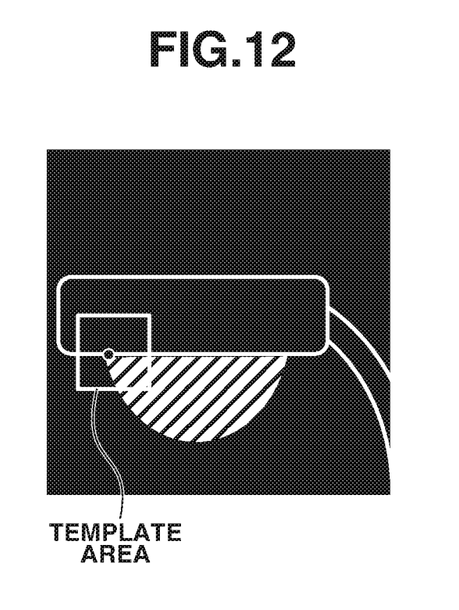
FIG. 12 is a diagram illustrating a case where an edge of the inappropriate area and an edge of an area except for the inappropriate area according the exemplary embodiment are adjacent to each other.

In a case where an edge of the inappropriate area and an edge of an area other than the inappropriate area are adjacent to each other, the inappropriate area may be included even when a template area is set based on feature points in the area other than the inappropriate area. FIG. 12 is a diagram illustrating the case where the edge of the inappropriate area and the edge of the area except for the inappropriate area are adjacent to each other. In the case in FIG. 12, in a case where the inappropriate are is intentionally excluded, the position of the template area may be shifted or the size of the template area is changed.

According to the second exemplary embodiment, even in a case where the number of feature points in the area other than the inappropriate area is small, the misalignment correction can be performed while maintaining the accuracy of the misalignment correction, by preferentially using a feature point in the area other than the inappropriate area.

In the above-described exemplary embodiments, while the digital camera for personal use is taken as an example, each of the exemplary embodiments is also applicable to, for example, a portable device, a smartphone, and a network camera connected to a server, as long as the apparatus has an HDR imaging function and a merging function.

The disclosure can also be implemented by supplying a program that implements one or more functions of the above-described exemplary embodiments to a system or apparatus via a network or storage medium, and causing one or more processors in a computer of the system or apparatus to read out the program and run the read-out program. The disclosure can also be implemented by a circuit (e.g., an application-specific integrated circuit (ASIC)) for implementing the one or more functions.

According to the configurations of the above-described exemplary embodiments of the disclosure, the image processing apparatus that increases alignment accuracy between images in the HDR merging can be provided.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The functions or operations performed by the computer may be referred to the corresponding units. They may correspond to subroutines, sub-programs, modules, or any other programmable modalities that are executed by the computer. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-165454, filed Sep. 11, 2019, which is hereby incorporated by reference herein in its entirety.

What is claimed is:

1. An image processing apparatus, comprising:
at least one memory configured to store instructions; and
at least one processor in communication with the at least one memory and configured to execute the instructions to:
perform correction of a misalignment between a plurality of images captured at exposures different from each other,
detect, as a first detection, an inappropriate area from the plurality of images,
detect, as a second detection, a feature point for the correction by preferentially using an area other than the inappropriate area of the plurality of images, and
merge the plurality of images on which the correction has been performed,
wherein the at least one processor executes the instructions to detect, in the second detection, the feature point from the inappropriate area in a case where a number of the feature points detected from the area other than the inappropriate area is less than a predetermined number.

2. The image processing apparatus according to claim 1, wherein the plurality of images is captured at a same angle of view at exposures different from each other.

3. The image processing apparatus according to claim 1, wherein the inappropriate area is a saturated area.

4. The image processing apparatus according to claim 3, wherein the at least one processor executes the instructions to detect, in the first detection, the inappropriate area based on pixel values or luminance values among the plurality of images and an exposure difference between the plurality of images.

5. The image processing apparatus according to claim 1, wherein the inappropriate area is an area where gradation properties are different from each other between the plurality of images.

6. The image processing apparatus according to claim 1, wherein the at least one processor executes the instructions to detect, in the first detection, an area where a pixel value is higher than a predetermined threshold of pixel value or an area where a luminance value is higher than a predetermined threshold of luminance value, as the inappropriate area in the plurality of images.

7. The image processing apparatus according to claim 1, wherein the at least one processor executes the instructions to detect, in the first detection, the inappropriate area in a first image from among the plurality of images, and to detect, in the second detection, the feature point in the first image.

8. The image processing apparatus according to claim 7, wherein the first image is an image captured at a highest exposure among the plurality of images.

9. The image processing apparatus according to claim 7, wherein the at least one processor executes the instructions to set a template area in an image different from the first image among the plurality of images, and to perform the correction using the template area.

10. The image processing apparatus according to claim 9, wherein the at least one processor executes the instructions to set the template area without including the inappropriate area in the template area.

11. The image processing apparatus according to claim 1, wherein a number of the feature points detected from the area other than the inappropriate area and the inappropriate area is equal to the predetermined number.

12. The image processing apparatus according to claim 1, wherein at least one processor executes the instructions to detect, in the second detection, the feature point in decreasing order of feature amount of the feature point from the inappropriate area.

13. An image processing apparatus, comprising:
at least one memory configured to store instructions; and
at least one processor in communication with the at least one memory and configured to execute the instructions to:
perform correction of a misalignment between a plurality of images captured at exposures different from each other,
detect, as a first detection, an inappropriate area from the plurality of images,
detect, as a second detection, a feature point for the correction by preferentially using an area other than the inappropriate area of the plurality of images, and merge the plurality of images on which the correction has been performed,
wherein the at least one processor executes the instructions to:
detect, in the second detection, the feature point from the area other than the inappropriate area and the inappropriate area, and
in the correction, assign a weight to a feature amount of the feature point detected from the inappropriate area to reduce the feature amount, and use a predetermined number of the feature points in decreasing order of the feature amount of the feature point which has been detected from the area other than the inappropriate area and the feature amount of the feature point which has been detected from the inappropriate area and assigned the weight of the feature point.

14. The image processing apparatus according to claim 1, wherein the at least one processor executes the instructions to create a merged image by the merging, and
wherein the merged image has a dynamic range wider than dynamic ranges of the plurality of images.

15. An image pickup apparatus, comprising:
an imaging sensor configured to capture a plurality of images at exposures different from each other;
at least one memory configured to store instructions; and at least one processor in communication with the at least one memory and configured to execute the instructions to:

perform correction of a misalignment between the plurality of images, detect, as a first detection, an inappropriate area from the plurality of images, detect, as a second detection, a feature point for the correction by preferentially using an area other than the inappropriate area of the plurality of images, and merge the plurality of images on which the correction has been performed, wherein the at least one processor executes the instructions to detect, in the second detection, the feature point from the inappropriate area in a case where a number of the feature points detected from the area other than the inappropriate area is less than a predetermined number.

16. An image processing method, comprising:

performing correction of a misalignment between a plurality of images captured at exposures different from each other;

detecting, as a first detection, an inappropriate area from the plurality of images;

detecting, as a second detection, a feature point for the correction by preferentially using an area other than the inappropriate area of the plurality of images; and merging the plurality of images on which the correction has been performed, wherein, as the second detection, the feature point is detected from the inappropriate area in a case where a number of the feature points detected from the area other than the inappropriate area is less than a predetermined number.

17. A non-transitory computer-readable storage medium storing a program to cause a computer to perform the image processing method according to claim 16.

18. The image processing apparatus according to claim 13, wherein the at least one processor executes the instructions to create a merged image by the merging, and wherein the merged image has a dynamic range wider than dynamic ranges of the plurality of images.

19. An image pickup apparatus, comprising:

an imaging sensor configured to capture a plurality of images at exposures different from each other;

at least one memory configured to store instructions; and at least one processor in communication with the at least one memory and configured to execute the instructions to:

perform correction of a misalignment between the plurality of images, detect, as a first detection, an inappropriate area from the plurality of images, detect, as a second detection, a feature point for the correction by preferentially using an area other than the inappropriate area of the plurality of images, and merge the plurality of images on which the correction has been performed, wherein the at least one processor executes the instructions to:

detect, in the second detection, the feature point from the area other than the inappropriate area and the inappropriate area, and in the correction, assign a weight to a feature amount of the feature point detected from the inappropriate area to reduce the feature amount, and use a predetermined number of the feature points in decreasing order of the feature amount of the feature point which has been detected from the area other than the inappropriate area and the feature amount of the feature point which has been detected from the inappropriate area and assigned the weight of the feature point.

20. An image processing method, comprising:

performing correction of a misalignment between a plurality of images captured at exposures different from each other;

detecting, as a first detection, an inappropriate area from the plurality of images;

detecting, as a second detection, a feature point for the correction by preferentially using an area other than the inappropriate area of the plurality of images; and merging the plurality of images on which the correction has been performed, wherein, in the second detection, the feature point is detected from the area other than the inappropriate area and the inappropriate area, and in the correction, a weight is assigned to a feature amount of the feature point detected from the inappropriate area to reduce the feature amount, and using a predetermined number of the feature points in decreasing order of the feature amount of the feature point which has been detected from the area other than the inappropriate area and the feature amount of the feature point which has been detected from the inappropriate area and assigned the weight of the feature point.

21. A non-transitory computer-readable storage medium storing a program to cause a computer to perform the image processing method according to claim 16.

* * * * *